US00RE36485E

United States Patent [19]

Adams

[11] E Patent Number: Re. 36,485

[45] Reissued Date of Patent: Jan. 11, 2000

[54] STEAM TRAP TEST STATION

[76] Inventor: Don L. Adams, Highway 86 E., Tulia, Tex. 79088

[21] Appl. No.: 09/098,222

[22] Filed: Jun. 16, 1998

Related U.S. Patent Documents

Reissue of:

[64] Patent No.: 5,595,211
Issued: Jan. 21, 1997
Appl. No.: 08/521,922
Filed: Aug. 31, 1995

[51] Int. Cl.[7] ..... F16K 11/06

[52] U.S. Cl. ..... 137/182; 137/177; 137/625.46

[58] Field of Search ..... 137/177, 182, 137/625.46

[56] References Cited

U.S. PATENT DOCUMENTS 5,199,458 4/1993 Wen ..... 137/625.47 X
5,445,187 8/1995 Farguhar ..... 137/182 X

OTHER PUBLICATIONS

D/A Manufacturing, P.O. Box T. Tulia, Texas 79088, "Model SE–4M 'Selector Valve'", May 1989. (2 pages).

Spence Engineering Co., Inc., Walden NY 12586–2035, "Data Sheet 3–2–1A (Type T & B Test and Blocking Steam Valve)", Aug. 1995. (2 pages).

Armstrong International, Inc., 816 Maple Street, P.O. Box 408, Three Rivers, Michigan 49093, "Bulletin No. 607 (The Compact Trap Test Station)", Aug. 1992. (7 pages).

*Primary Examiner*—John Fox
*Attorney, Agent, or Firm*—Daniel V. Thompson

[57] ABSTRACT

A steam trap test station includes a body connected to [a source of steam] *an inlet for steam and condensate from an object to be heated by steam*, a steam trap and [an object to be heated by steam] *a condensate outlet*. A rotor *is* fixed for rotation in the body. The body [having] *has* porting walls defining body ports, and the rotor has porting walls defining rotor ports. The body and rotor ports are adapted and arranged such that an "ON" mode is provided wherein steam *and condensate* passes through the station from the [source of steam] *inlet* through the steam trap to the [object to be heated] *outlet*. A "TEST OUTLET" mode [being] *is* first reached when the rotor is turned in a first direction from the "ON" mode wherein [an] *the* outlet [max] *may* be tested for leakage. A "TEST INLET" mode is second reached when the rotor is turned in the first direction from the "ON" mode wherein *the* inlet [media] may be tested. A "BYPASS & VENT" mode is first reached when the rotor is turned in a second direction from the "ON" mode wherein the steam trap is bypassed and vented. An "OFF" mode is second reached when the rotor is turned in the second direction from the "ON" mode wherein steam [is] *and condensate are* blocked.

5 Claims, 7 Drawing Sheets

STEAM TRAP TEST STATION

Matter enclosed in heavy brackets [ ] appears in the original patent but forms no part of this reissue specification; matter printed in italics indicates the additions made by reissue.

REFERENCE TO DISCLOSURE DOCUMENT

Reference is made to Disclosure Document No. 362,589 filed Sep. 30, 1994.

FIELD OF THE INVENTION

This invention is related to steam traps, and more particularly to a test station apparatus for testing steam traps for leakage and functionality.

BACKGROUND ART

This invention is related to steam traps which are used throughout industry where heat is extracted from steam for any number of reasons. As steam injected into the object to be heated, the by-product (condensed steam), must be removed from the object in a timely manner such that additional steam may enter to continue the heat transfer process. However, it is important that uncondensed steam not be allowed to leave the object in that vast quantities of energy would be wasted. To prevent such inefficiency, a device commonly called a "steam trap" is installed on the discharge of the above mentioned object which only allows condensate to pass through to the condensate collection system. This condensate trap is a mechanical device reasonably subject to failure due to wear or plugging of the small orifice passages characteristic of these devices. Consequently, such devices are typically accompanied by a system of valves within the piping to service the steam trap.

The number of valves and fittings required to properly test, vent, bypass and isolate a steam trap station can be from a minimum of two to an ideal of eight valves along with several pipe tees, nipples, unions, etc. The cost of the ideal valving system can often exceed the cost of the steam trap by a factor of two. The type of valves required is also special and expensive, because of the stringent requirements steam places upon equipment. In fact, years ago the inventor developed a special type of valve for this service and continues to market thousands of these valves per year; however, it is only a two valve manifold and it takes two of them plus one additional block valve to accomplish an ideal steam trap service station. After considerable research and failure over several years, the inventor has developed a one handle test station that will accomplish all of the valving requirements of the ideal trap service station, but further adds the very important dimensions of safety, convenience, compactness, and cost effectiveness.

SUMMARY OF THE INVENTION

This invention consists of a unique design or process whereby a one handle steam trap station replaces a group of eight two-way valves and accomplishes exactly the right sequence of open or closed portings as the one handle selects any of the five required service modes as illustrated in FIGS. 5A–5E and 6. As the handle is rotated through the five functions and back, fifty nine (59) discrete requirements of open and/or closed valve ports must be accomplished along with perfect timing and sequence to successfully service the steam trap. If only one of these port openings or closings is out of sequence, the entire process would be worthless.

Furthermore, the order in which the service functions occur as the station handle is rotated must be right. The test modes need to occur only as the handle is rotated in one direction; while the vent, the bypass and trap removal functions need to be grouped properly under the opposite rotation of the handle. (For example, if the "OFF" mode were reached prior to the "VENT" mode, the process would be useless. Similarly, if "TEST OUTLET" is reached between "BYPASS & VENT" and "OFF" the process would be useless, etc.)

The common belief is that the only way to accomplish a process sequencing this complex and interrelated is to provide a complex, adjustable-cam system of eight valves and cams, with numerous trip points on each cam, such that the actuation of each valve could be predetermined and set as the cams rotate through their cycle. Such an arrangement would not be practical for a steam trap manifold because of the cost of producing and maintaining such a device would be prohibitive. The rising stem type valves required would also be a poor choice for steam service according to the inventor's past years of experience in steam valving.

This invention results in a very unique and special arrangement of ports within a disc valve which happens to allow the complex system above to be reduced to a very simple device with one moving part which utilizes the sliding seal, straight-through ports and dry running valve face which the inventor's years of experience teaches is so important in steam valve service.

Table 1 is a listing of porting changes required as each service mode is selected.

DETAILED DESCRIPTION OF THE PREFERRED EMBODIMENT

Figure 1:
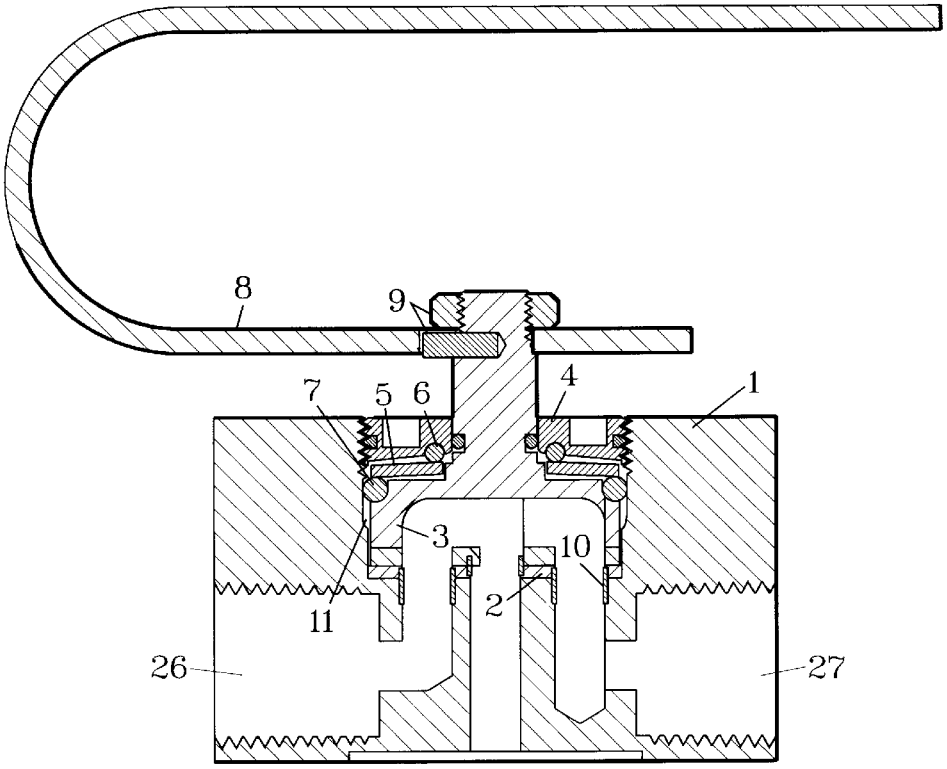
FIG. 1 is a partially broken-away side view of a steam trap station constructed in accordance with the invention.

Referring to FIG. 1, a body 1 is provided with a disc seal 2 and rotor 3 which is retained in body 1 via an adjustable nut 4 acting upon spring washer 5 through thrust bearing 6 and upon thrust bearing and detent balls 7 which pushes down on rotor 3. A handle 8 is attached to rotor 3 via nut and pin 9 to facilitate rotation of rotor 3. Seal anti-extrusion inserts 10 maybe pressed into body 1 at each port location to retain the seal material as rotor 3 develops sealing pressures within seal 2 and presses against the soft elastomeric material.

Figure 2:
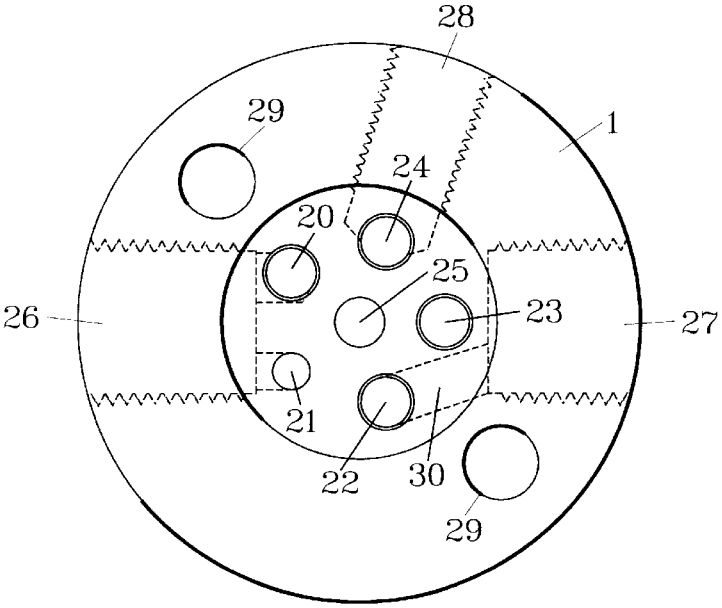
FIG. 2 is a top view of the body to illustrate the port locations within the body.

FIG. 2 illustrates the body porting walls that form a series of six body ports. The body ports include main inlet port 20, second inlet port 21, outlet port 22, trap return port 23, test port 24, and trap supply port 25. Body inlet connection 26 communicates with main inlet port 20 and second inlet port 21. Outlet connection 27 communicates with outlet port 22. Test connection 28 communicates with test port 24.

Figure 3:
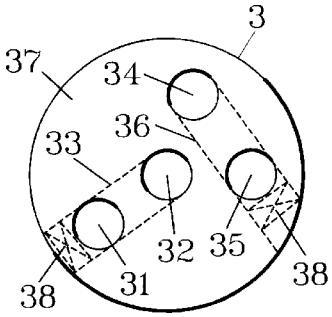
FIG. 3 is a schematic view of the rotor to illustrate port locations within the rotor.

As shown on FIG. 3 rotor porting walls define a series of four rotor ports. The rotor ports include first rotor port 31 connected to second rotor port 32 via first cross-drilled port 33, and a third rotor port 34 connected to fourth rotor port 35 via second cross-drilled port 36. Plugs 38 are located at the ends of first and second cross-drilled ports 33, 36.

Figure 5A:
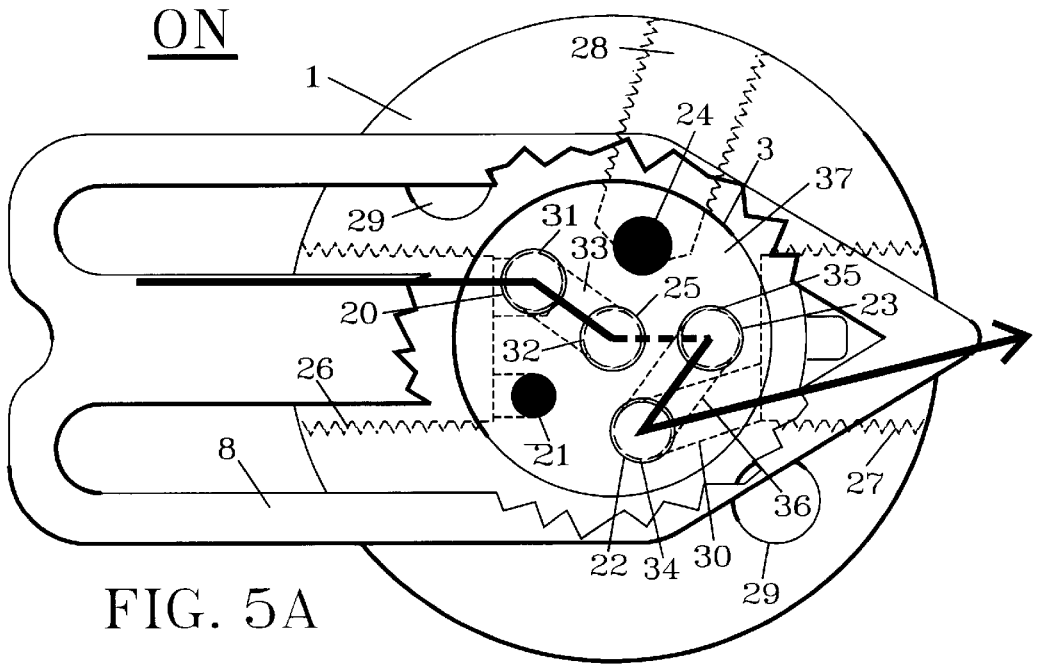
FIGS. 5A, 5B, 5C, 5D, and 5E are schematic views of the station to illustrate interaction between the rotor and body portings during operation.
Figure 5B:
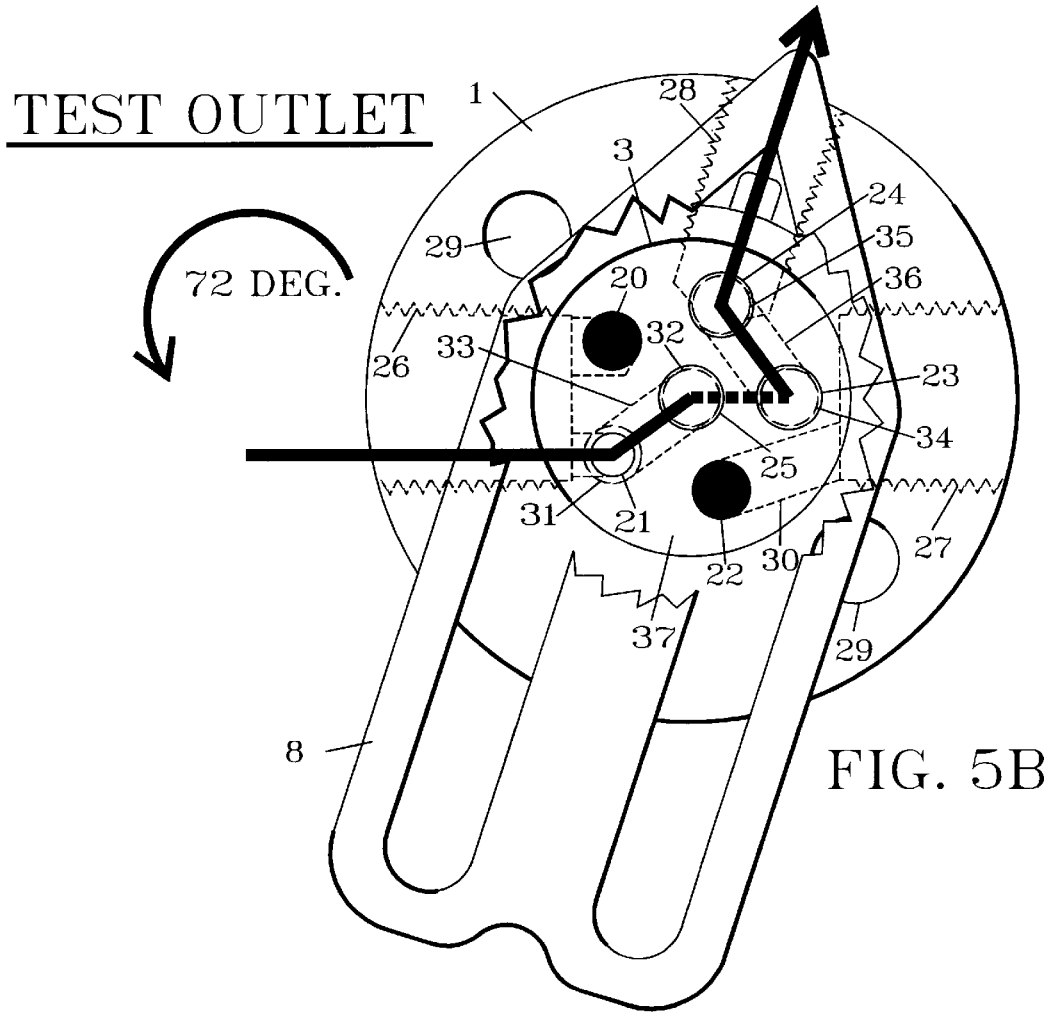
Figure 5C:
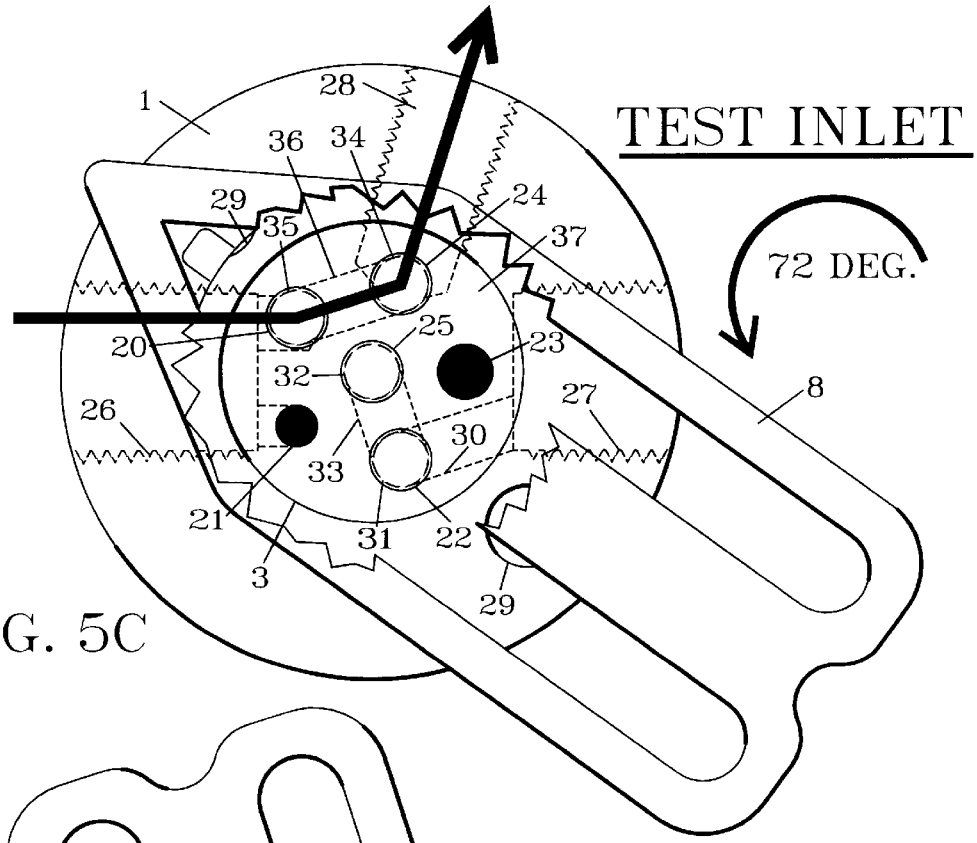
Figure 5D:
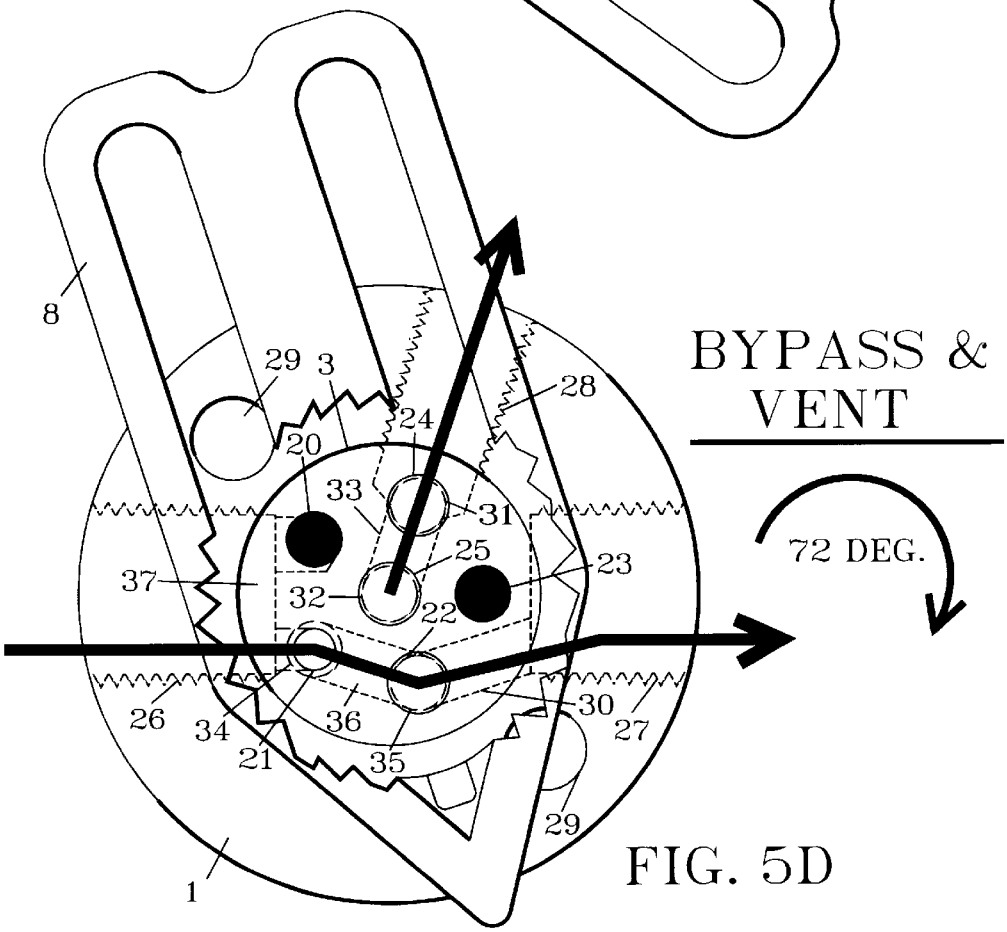
Figure 5E:
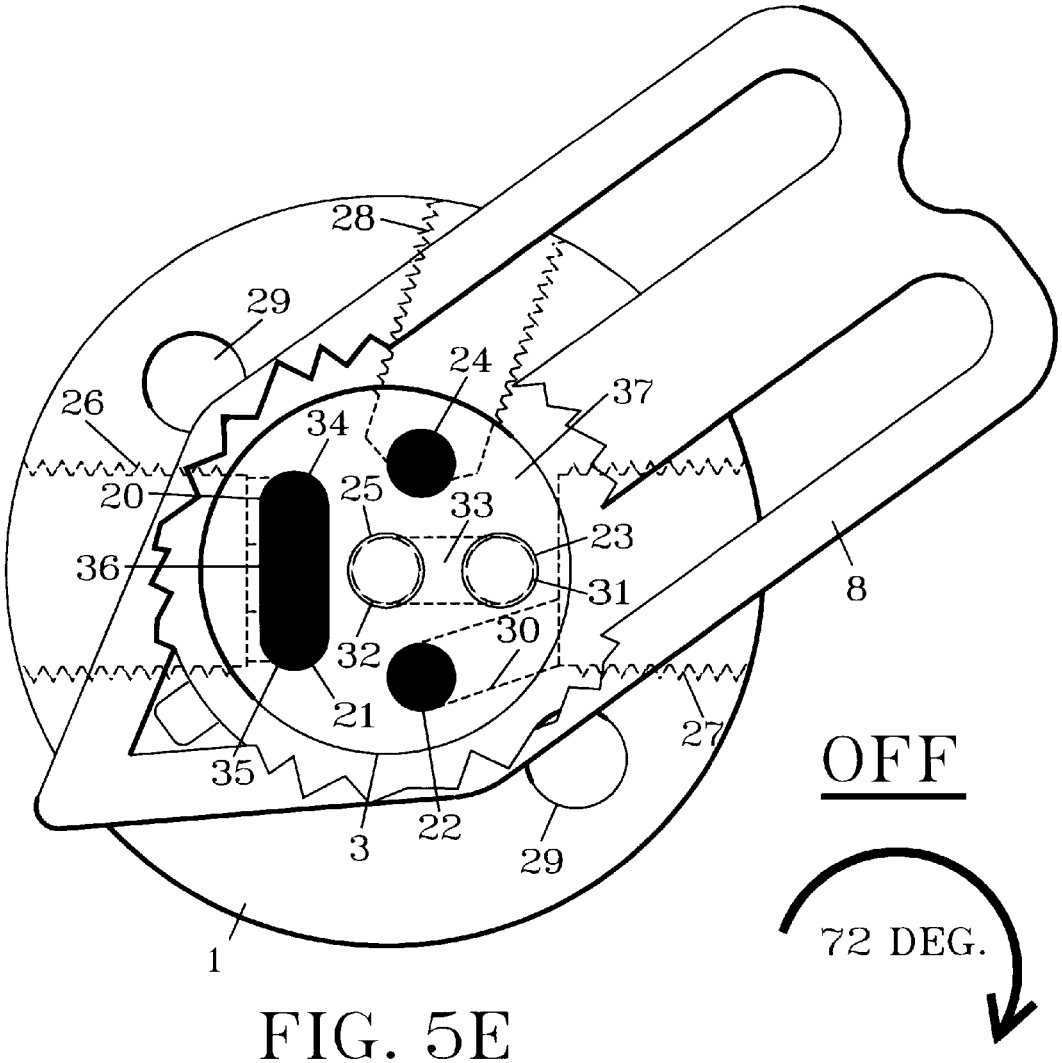
Figure 6:
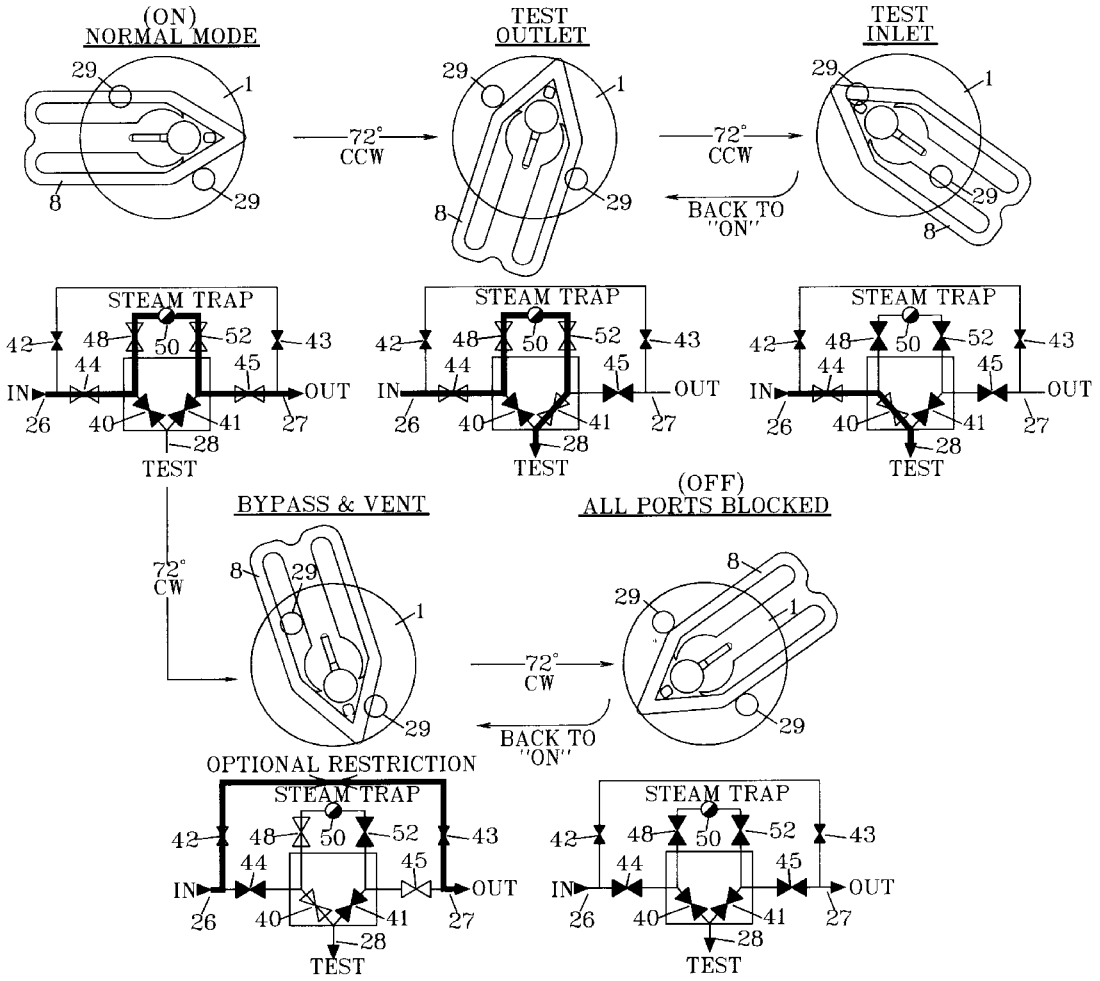
FIG. 6 is a series of flow schematics that illustrate the valving functions of the steam trap station as its handle is rotated through each service mode.
Figure 7B:
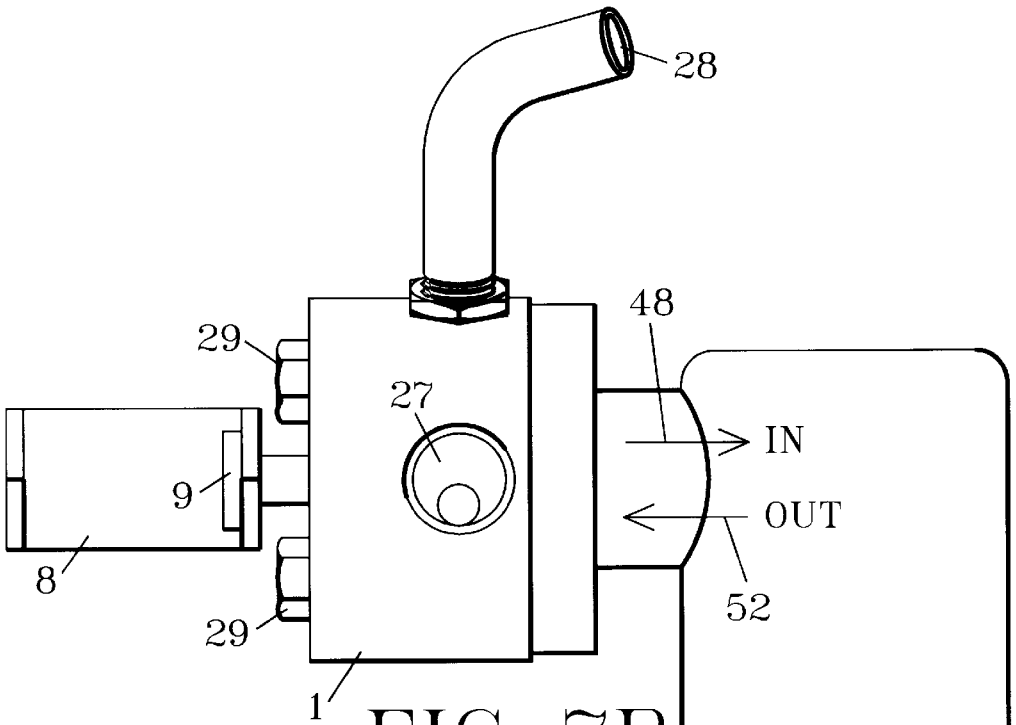
FIG. 7B is a side view of the station mounted to a typical steam trap.

In operation, FIGS. 5A–5E and 6 illustrate the unique interaction of these ten body and rotor ports as the rotor 3 is rotated upon seal 2 within body 1. Choosing the "ON" position in FIG. 5A, steam and condensate flows into body 1 via inlet connection 26, out body 1 via main inlet port 20 and into rotor 3 via first rotor port 31 to pass through first cross-drilled port 33 and exit second rotor port 32 into trap supply port 25, which exits out body 1 into the steam trap inlet conduit 48 (FIG. 5A) which is flanged directly to the back of the body 1 via two bolts 29 shown in FIG. 7B. Condensate returns from the condensate trap 50 from its outlet 52 which is likewise flanged directly to the back of the body 1 via trap return port 23. (FIG. 5A) The condensate exits trap return port 23 and into rotor 3 via fourth rotor port 35 to pass through second cross-drilled port 36 and out third rotor port 34 into outlet port 22 to pass through body interconnect port 30 to body outlet connection 27. The test connection 28 is properly blocked off by the action of test port 24 acting against a blank unported position of face 37 of rotor 3. In Table 1, section "ON" lists the port requirements of the station in the "ON" mode. FIG. 6 section "ON" offers a schematic illustration of the same port requirements.

In Table 1,"TEST OUTLET" next lists the port changes that must take place as the handle 8 rotates rotor 3 counterclockwise 72° to the first test function shown on FIG. 5B as "TEST OUTLET". In "TEST OUTLET" mode, flow of steam and condensate enters body 1 at inlet connection 26 and flows through second inlet port 21 into first rotor port 31 and through first cross-drilled port 33 and out second rotor port 32 into trap supply port 25 to the steam trap inlet conduit 48 and return through steam trap outlet conduit 52 to trap return port 23 to enter third rotor port 34 to pass through second cross-drilled port 36 and exit rotor though fourth rotor port 35 to intersect body test connection 28 via test port 24. Thus the operator is able to visually inspect the performance of the steam trap by seeing the output of the trap and judging whether the trap is only outputting condensate as it should or if it is passing steam.

Next, the operator may wish to see what is coming to the trap to verify that the piping is not plugged or that the inlet piping is indeed full of condensate due to a plugged trap valve. As he selects "TEST INLET" mode he turns handle 8 to rotate rotor 3 72° to the "TEST INLET" mode shown on FIG. 5C which will cause the properly sequenced port changes listed in Table 1 under "TEST INLET". Flow will now enter body 1 though inlet connection 26 and exit body 1 via main inlet port 20 into rotor 3 through fourth rotor port 35 to flow through second cross-drilled port 36 and exit third rotor port 34 into test port 24 to interconnect to test connection 28. The operator can now see what is coming to the trap and make proper judgements.

If the steam trap tests good the operator will dial handle 8 back to position "ON" (FIG. 5A).

If the trap tests "bad" he will dial the handle 72° to position "BYPASS & VENT" (FIG. 5D). Table 1 section "BYPASS & VENT" lists the port changes that must take place as the bypass and vent function is selected. Flow now enters body inlet connection 26 and exits body 1 via second inlet port 21 into rotor 3 via third rotor port 34, flows through second cross-drilled port 36 to exit rotor 3 through fourth rotor port 35 and flow into body 1 via outlet port 22 and through body port 30 to exit body 1 through outlet connection 27. This flow pattern is termed "bypass" in that it allows the steam/condensate media to continue flowing restricted only by smaller second inlet port 21, even while the steam trap is isolated and/or removed. Simultaneously, trap supply port 25 is connected to second rotor port 32 which interconnects to test port 24 and to test connection 28. Thus the trap inlet conduit 48 is allowed to flow out the test connection 28. Since the trap outlet conduit 52 is blocked by trap return port 23 acting against a blank portion of face 37 of rotor 3, no fluid can enter the steam trap 50 (FIG. 7B) via the trap outlet conduit 52, so that the net result is that all pressure is vented off the steam trap 50 through the test connection 28. It is now safe to remove the two bolts 29 and remove steam trap 50. It is mandatory that pressure within steam trap 50 be bled off through its inlet conduit 48 in that a valve internal to steam trap 50 is typically located on its outlet conduit 52 and could, unbeknownst to the operator, prevent pressure from properly venting, thus causing injury to the person loosening bolts 29 to remove steam trap 50. Thus the automatic and proper porting within the station of the present invention is protecting the person from this commonly safety hazard encountered on manually operated multi-valve systems. It also should be noted that this same mode is commonly used during start-up in that the bypassing of steam trap 50 allows maximum, although uncontrolled, heat input to the object being heated; and allows contamination collected within the piping to pass though the station and out of the system rather than becoming lodged within the small steam trap ports.

If it would be undesirable to leave live steam flowing through the object being heated while the trap is removed, or if the operator simply wishes to stop all condensate flow for various reasons, he may simply dial handle 8 72° further to the "OFF" mode as shown in FIG. 5E. The porting changes required to accomplish this are listed on Table 1, Section "OFF". This 72° turn causes flow coming in body inlet connection 26 to enter main inlet port 20 and exit body 1 via third rotor port 34 through second cross-drilled port 36 to fourth rotor port 35 to exit trap return port 23 to second inlet port 21 which is also connected to body inlet connection 26. Thus the fluid entering body inlet connection in only connected to itself and is blocked or isolated from other ports within the body 1. Simultaneously outlet port 22 is acting upon a blank portion of rotor face 37 and is thus blocked such that fluid pressure existing in body outlet connection 27 cannot enter the rotor 3 porting. Similarly test outlet connection is blocked by action of test port 24 being blocked by a blank section of rotor face 37.

Figure 4:
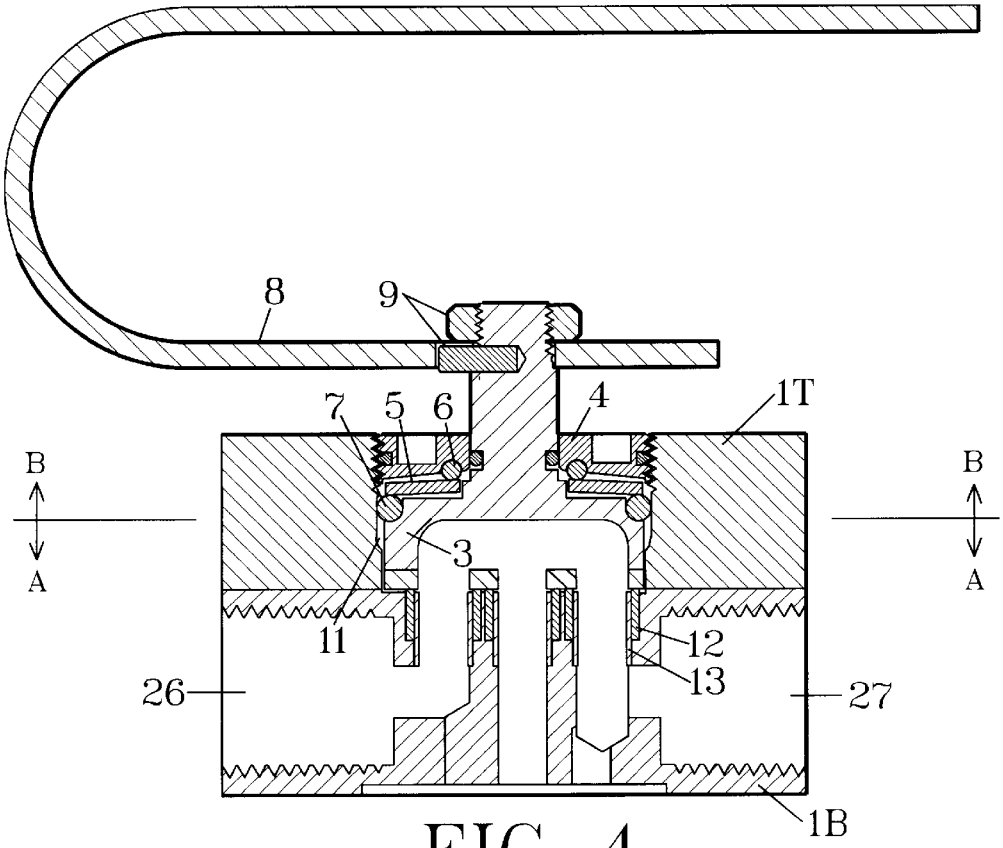
FIG. 4 is a view similar to FIG. 1 that illustrates an alternate seat system utilizing six insert seats rather than one big disk seat, with FIGS. 4A, and 4B being sectional views taken along lines A—A and B—B, respectively.
Figure 4B:
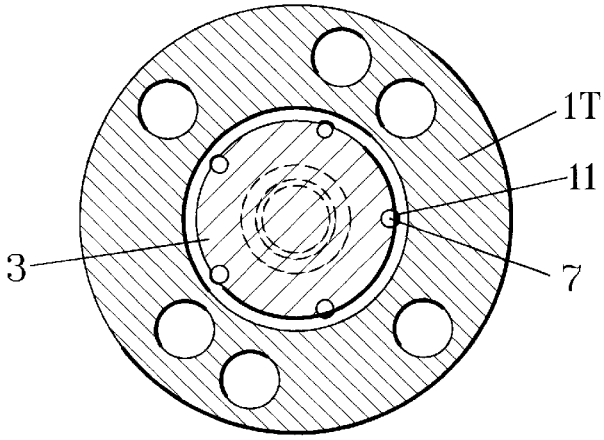
Figure 4A:
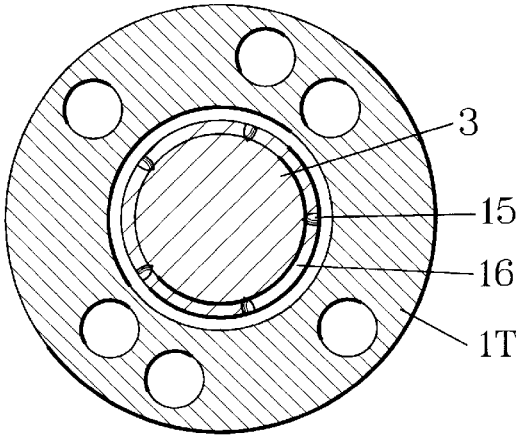

When an extension is required of the operating temperature and pressures above the limits of available elastomers used to make disk 2 (FIG. 1), it has been found advantageous to modify the station design as illustrated in FIG. 4, 4A and 4B. The disk of rotor 3 is now replaced by six cylindrical shaped seats 12 acting as seals against rotor 3. It also becomes advantageous to reconfigure body 1 (FIG. 1) into two pieces, 1T and 1B (FIG. 4) to allow lapping the seats 12 flat after they are installed into body half 1B. If the seats 12 are of a ceramic or other hard, strong material they will not necessarily require inserts 13 to support and lock them in body half 1B.

An important feature of this alternate embodiment of the invention is the unique, efficient design of making triple use of bearing balls 7 (FIG. 4). These 5 balls serve as: (1) a thrust bearing which transmits the force coming from spring washer 5 into rotor 3, (2) an alignment bearing acting between body half 1T and rotor 3 to keep rotor 3 properly located over seats 12, (3) a detent system to very positively locate and lock the rotary position of rotor 3 within body half 1T. It is apparent from studying FIG. 1 how balls 7 serve as a thrust bearing and an alignment bearing. Reference is made to FIG. 4 to illustrate how balls 7 simultaneously serve as in improved detent position locator. There are five grooves 11 (FIG. 4B) provided in body half 1T in which the five balls 7 are trapped with respect to body half 1T. As rotor 3 is rotated via handle 8, balls 6 and spring washers 5 (FIG. 4) are free to rotate at will; however, balls 7 must remain keyed to the body via grooves 11 evenly spaced 72° apart. Provided in rotor 3 are five very shallow detent recesses 15 (FIG. 4A) evenly spaced 72° apart and located on the surface of ball race 16. As rotor 3 with detent recesses 15 rotates within body half 1T to which keyed balls 7 via grooves 11, the five balls will all simultaneously roll into the five detent recesses and cause the rotor to very briskly snap into position. This coincidence of ball and detent alignment happens a fixed number of times during one revolution of the rotor; thus providing the five position locating detents required at each of the five function modes of this invention.

The advantages of this system are:

1) Economics—a minimum amount of hardware is required to accomplish all three functions outlined above.

2) Balanced, Low stress System—the high internal forces to produce to accomplish the anti-rotation torque required to produce a firm, positive locating detent is often the source of sealing and wear problems in typical rotary valve designs. A typical one detent ball design results in strong radial forces against the rotor stem resulting in heavy load on the stem seals and a rocking of the rotor 3 (FIG. 1) on the main seats 2. Thus, contaminants get between the seats and rotor and result in scratching damage to the seats and rotor. The development used in this unique balanced detent system, along with the special shaped handle 8 (FIG. 1), eliminate unbalanced radial loads and lifting of the rotor.

Figure 7A:
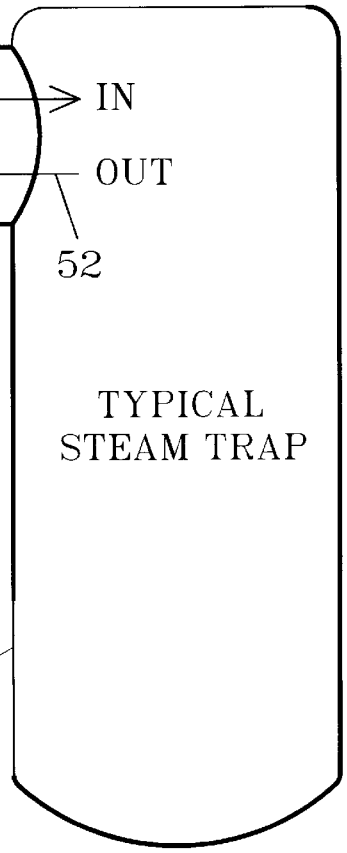
FIG. 7A is a front view of the steam trap station.
Figure 7A:
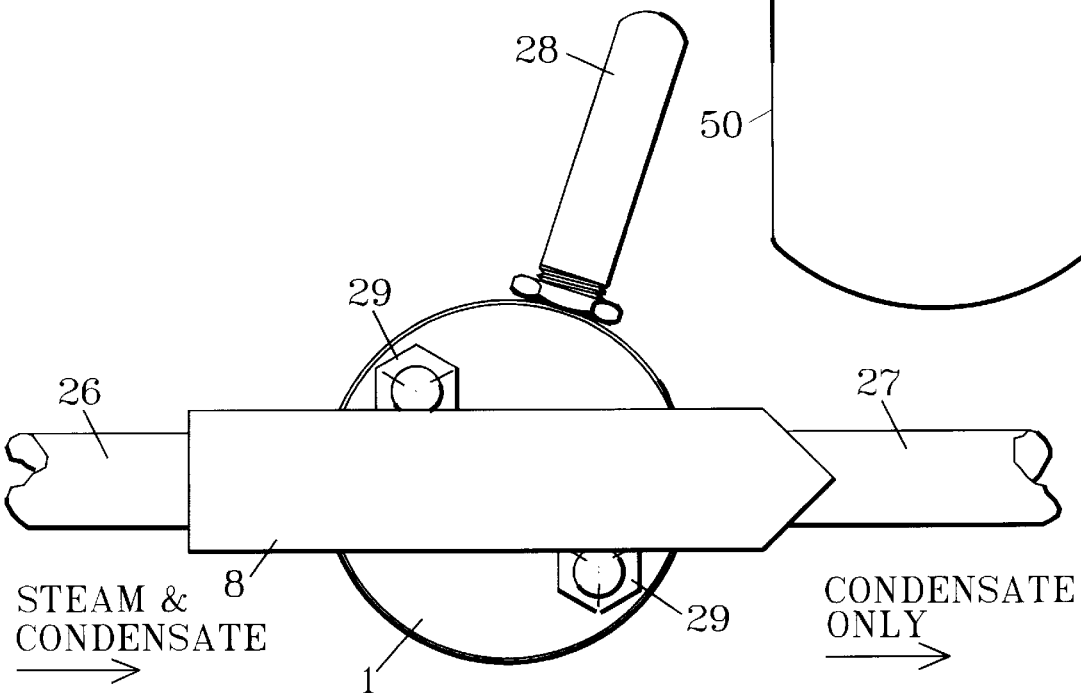

The handle 8 (FIGS. 1 and 7A) is a simple lever handle, but improved by bending the end portion of the handle up over the top of the rotor such that the operator injects pure rotary torque into the rotor. The conventional straight lever handle forces the operator to grasp the handle and push sideways to produce rotation. This side push results in an equal and opposite radial push on the rotor stem as well as torque equal to the side push times the length of the moment arm. Since my improved handle only allows negligible moment arm between the point of grasping and the stem, the side load on the rotor is eliminated and the operator is only able to transmit a twist or torque directly to the rotor.

Whereas, the present invention has been described with the respect to a specific embodiment thereof, it will be understood that various changes and modifications will be suggested to one skilled in the art, and it is intended to encompass such changes and modifications as fall within the scope of the appended claims.

TABLE 1

| SEQUENCE OF NECESSARY VALVE PORT CHANGES AS EACH SERVICE FUNCTION IS SELECTED |
|---|
| ON: (0°) |
| BOTH INLET & OUTLET VALVES 44,45, FIG. 6, MUST BE OPEN |
| BOTH TEST/VENT VALVES 40,41 MUST BE CLOSED |
| AT LEAST ONE BYPASS VALVE 42 OR 43 MUST BE CLOSED |
| BOTH STEAM TRAP VALVES 48,52 MUST REMAIN OPEN |
| TEST OUTLET: (CCW 72° from Normal) |
| INLET VALVE 44 MUST REMAIN OPEN |
| OUTLET VALVE 45 MUST BE CLOSED |
| BOTH STEAM TRAP VALVES 48,52 MUST REMAIN OPEN |
| OUTLET TEST VALVE 41 MUST BE OPENED |
| INLET TEST VALVE 40 MUST REMAIN CLOSED |
| BYPASS VALVES 42,43 MUST REMAIN CLOSED |
| TEST INLET: (CCW approx. 72° from Test Outlet) |
| INLET VALVE 44 MUST REMAIN OPEN |
| INLET TEST VALVE 40 MUST BE OPENED |
| OUTLET TEST VALVE 41 MUST CLOSE |
| OUTLET VALVE 45 MAY REMAIN CLOSED |
| INLET STEAM TRAP VALVE 48 MUST BE CLOSED |
| OUTLET STEAM TRAP VALVE 52 MUST BE CLOSED |
| BOTH BYPASS VALVES 42.43 MUST REMAIN CLOSED |
| BYPASS & VENT: (CW 72° from Normal) |
| INLET VALVE 44 MUST BE CLOSED |
| OUTLET VALVE 45 MAY REMAIN OPEN ONLY IF VENT AND TRAP OUTLET VALVES 41,52 BOTH CLOSE |
| BOTH BYPASS VALVES 42,43 MUST BE OPENED |
| THE INLET VENT VALVE 40 MUST BE OPENED |
| THE OUTLET VENT VALVE 41 MUST REMAIN CLOSED |
| THE INLET TRAP VALVE 48 MUST REMAIN OPEN (outlet valve would not work because of internal valve within trap) |
| THE OUTLET TRAP VALVE 52 MUST BE CLOSED |
| OFF: (CW 72° from Bypass Vent) |
| INLET VALVES 42,44 MUST BE CLOSED |
| OUTLET VALVES 43,45 MUST BE CLOSED |
| VENT VALVES 40,41 ARE CLOSED |
| TRAP VALVES 48,52 MAY EQUALIZE BUT MUST BE CLOSED, RESPECT TO MAIN INLET, OUTLET AND TEST PORTS |

I claim:

1. A steam trap test station, comprising:

a body connected to [a source of steam] *an inlet for steam and condensate from an object to be heated by steam*, a steam trap and [an object to be heated by steam] *a condensate outlet*;

a rotor fixed for rotation in the body;

the body having porting walls defining body ports;

the rotor having porting walls defining rotor ports;

the body and rotor ports being adapted and arranged such that an "ON" mode is provided wherein steam *and condensate* passes through the station from the [source of steam] *inlet* through the steam trap to the [object to be heated] *outlet*, with a "TEST OUTLET" mode being first reached when the rotor is turned in a first direction from the "ON" mode wherein [an] *the* outlet may be tested for malfunction, and with a "TEST INLET" mode being second reached when the rotor is turned in the first direction from the "ON" mode wherein *the* inlet [media] may be tested.

2. A steam trap test station, comprising:

a body connected to [a source of steam] *an inlet for steam and condensate from an object to be heated by steam*, a steam trap and [an object to be heated by steam] *a condensate outlet*;

a rotor fixed for rotation in the body;

the body having porting walls defining body ports;

the rotor having porting walls defining rotor ports;

the body and rotor ports being adapted and arranged such that an "ON" mode is provided wherein steam *and*

*condensate* passes through the station from the [source of steam] *inlet* through the steam trap to the [object to be heated] *outlet*, with a "BYPASS & VENT" mode being first reached when the rotor is turned in a second direction from the "ON" mode wherein the steam trap is bypassed and vented, and with an "OFF" mode being second reached when the rotor is turned in the second direction from the "ON" mode wherein steam [is] *and condensate are* blocked.

3. The station of claim 1 with the body and rotor ports being adapted and arranged with a "BYPASS & VENT" mode being first reached when the rotor is turned in a second direction from the "ON" mode, and with an "OFF" mode being second reached when the rotor is turned in the second direction from the "ON" mode.

4. A steam trap test station, comprising:

a body connected to [a source of steam] *an inlet for steam and condensate from an object to be heated by steam*, a steam trap and [an object to be heated by steam] *a condensate outlet*;

a rotor fixed for rotation in the body;

the body having porting walls defining body ports;

the rotor having porting walls defining rotor ports;

the body and rotor ports being adapted and arranged such that an "ON" mode is provided wherein steam *and condensate* passes through the station from the [source of steam] *inlet* through the steam trap to the [object to be heated] *outlet*, with a "TEST INLET" mode being reached when the rotor is turned in a first direction from the "ON" mode wherein *the* inlet media may be tested, and with a "BYPASS & VENT" mode being reached when the rotor is turned in a second direction from the "ON" mode.

5. A steam trap test station, comprising:

a body connected to [a source of steam] *an inlet for steam and condensate from an object to be heated by steam*, a steam trap and [an object to be heated by steam] *a condensate outlet*;

a rotor fixed for rotation in the body;

the body having porting walls defining body ports;

the rotor having porting walls defining rotor ports;

the body and rotor ports being adapted and arranged such that an "ON" mode is provided wherein steam *and condensate* passes through the station from the [source of steam] *inlet* through the steam trap to the [object to be heated] *outlet*, with a "TEST INLET" mode being reached when the rotor is turned in a first direction from the "ON" mode wherein *the* inlet media may be tested, and with an "OFF" mode being reached when the rotor is turned in a second direction from the "ON" mode wherein steam [is] *and condensate are* blocked.

* * * * *